United States Patent
Leong et al.

(10) Patent No.: US 8,570,862 B1
(45) Date of Patent: Oct. 29, 2013

(54) MAPPING A PORT ON A PACKET SWITCH APPLIANCE

(75) Inventors: Patrick Pak Tak Leong, Palo Alto, CA (US); King L. Won, San Jose, CA (US); Ted Ho, San Jose, CA (US)

(73) Assignee: Gigamon Inc., Milpitas, CA (US)

( * ) Notice: Subject to any disclaimer, the term of this patent is extended or adjusted under 35 U.S.C. 154(b) by 326 days.

(21) Appl. No.: 12/876,128

(22) Filed: Sep. 4, 2010

Related U.S. Application Data

(63) Continuation of application No. 11/701,731, filed on Feb. 2, 2007, now Pat. No. 7,889,748.

(51) Int. Cl.
*H04J 1/16* (2006.01)

(52) U.S. Cl.
USPC .......... 370/230; 370/235; 370/389; 370/401; 370/249

(58) Field of Classification Search
USPC .................. 370/389, 392, 401, 230, 235, 249
See application file for complete search history.

(56) References Cited

U.S. PATENT DOCUMENTS

| | | | |
|---|---|---|---|
| 5,946,308 A | 8/1999 | Dobbins et al. | |
| 6,208,649 B1 | 3/2001 | Kloth | |
| 6,298,061 B1 | 10/2001 | Chin et al. | |
| 6,385,197 B1 | 5/2002 | Sugihara | |
| 6,898,086 B2 | 5/2005 | Takami et al. | |
| 7,111,101 B1 | 9/2006 | Bourke et al. | |
| 7,145,866 B1 | 12/2006 | Ting et al. | |
| 7,170,892 B2 | 1/2007 | Major et al. | |
| 7,225,270 B2 * | 5/2007 | Barr et al. ..................... | 709/238 |
| 7,627,248 B2 * | 12/2009 | Peisl et al. ..................... | 398/94 |
| 7,672,243 B2 * | 3/2010 | Mayhew ....................... | 370/392 |
| 7,688,825 B2 | 3/2010 | Shimizu | |
| 7,792,113 B1 * | 9/2010 | Foschiano et al. ............ | 370/392 |
| 8,149,836 B2 * | 4/2012 | Porat ............................. | 370/392 |
| 2001/0055274 A1 * | 12/2001 | Hegge et al. .................. | 370/229 |
| 2002/0010800 A1 * | 1/2002 | Riley et al. .................... | 709/249 |
| 2002/0075809 A1 * | 6/2002 | Phaal ............................. | 370/245 |
| 2002/0176426 A1 | 11/2002 | Asano et al. | |
| 2004/0047353 A1 * | 3/2004 | Umayabashi et al. ... | 370/395.63 |
| 2005/0053073 A1 * | 3/2005 | Kloth et al. .............. | 370/395.41 |
| 2005/0083835 A1 | 4/2005 | Prairie et al. | |
| 2005/0254490 A1 | 11/2005 | Gallatin et al. | |
| 2005/0265248 A1 | 12/2005 | Gallatin et al. | |
| 2005/0265364 A1 * | 12/2005 | Gallatin et al. ............... | 370/401 |
| 2005/0271065 A1 | 12/2005 | Gallatin et al. | |
| 2008/0056122 A1 | 3/2008 | Madhi et al. | |

OTHER PUBLICATIONS

Non-Final Office Action dated Oct. 5, 2009 for U.S. Appl. No. 11/701,731.
Non-Final Office Action dated May 26, 2010 for U.S. Appl. No. 11/701,731.
Notice of Allowance and Fees Due dated Oct. 1, 2010 for U.S. Appl. No. 11/701,731.

* cited by examiner

*Primary Examiner* — Ricky Ngo
*Assistant Examiner* — Dewanda Samuel
(74) *Attorney, Agent, or Firm* — Vista IP Law Group, LLP

(57) ABSTRACT

A packet switch appliance includes a plurality of ports. One of the plurality of ports is configured to operate as a network port connected to a packet-switching network. To map the network port of the packet switch appliance, a port map is created. The port map includes a first map rule, which has a first criterion and a first action, and at least a second map rule, which has a second criterion and a second action. The port map is assigned to the network port. When an ingress packet is received from the packet-switching network through the network port, the port map is applied to the ingress packet.

45 Claims, 5 Drawing Sheets

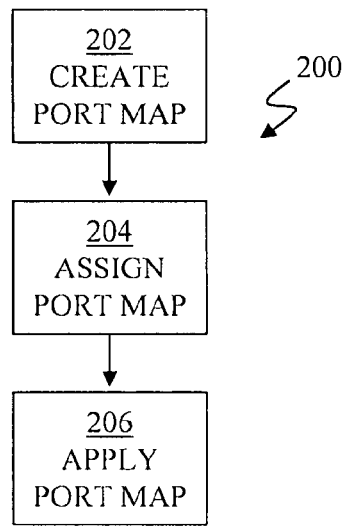
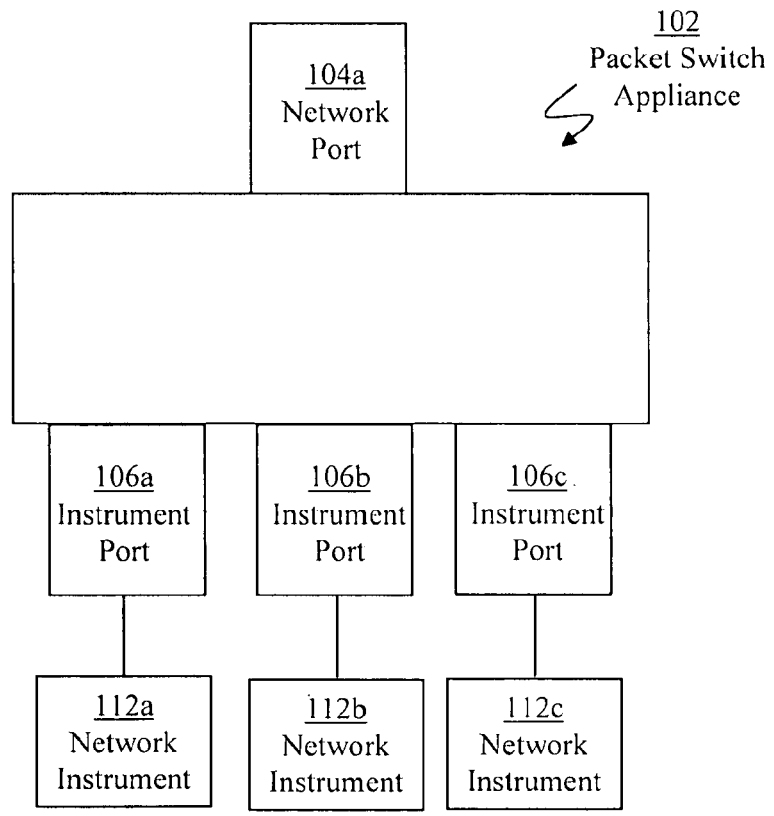

MAPPING A PORT ON A PACKET SWITCH APPLIANCE

RELATED APPLICATION DATA

This application is a continuation of U.S. patent application Ser. No. 11/701,731, filed on Feb. 2, 2007, now U.S. Pat. No. 7,889,748 the entire disclosure of which is expressly incorporated by reference herein.

BACKGROUND

1. Field

The present application generally relates to packet switch appliances, and, more particularly, to mapping a port on a packet switch appliance.

2. Related Art

In a packet-switching network, the transmission, routing, forwarding, and the like of messages between the terminals in the packet-switching network are broken into one or more packets. Associated with each terminal in the packet-switching network is a unique terminal address. Each of the packets of a message has a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destination terminal. One skilled in the art commonly refers to the source terminal address and the destination terminal address as the source address and the destination address, respectively.

Packet switch appliances can be used to forward packets in the packet-switching network. Packet switch appliances have one or more network ports connected to the packet-switching network. The network port of a packet switch appliance can include a filter, which either drops or forwards packets. A conventional filter typically has only a single condition, which is used to determine whether a packet is to be dropped or forwarded.

SUMMARY

In one exemplary embodiment, a packet switch appliance includes a plurality of ports. One of the plurality of ports is configured to operate as a network port connected to a packet-switching network. To map the network port of the packet switch appliance, a port map is created. The port map includes a first map rule, which has a first criterion and a first action, and at least a second map rule, which has a second criterion and a second action. The port map is assigned to the network port. When an ingress packet is received from the packet-switching network through the network port, the port map is applied to the ingress packet.

DESCRIPTION OF DRAWING FIGURES

The present application can be best understood by reference to the following description taken in conjunction with the accompanying drawing figures, in which like parts may be referred to by like numerals:

FIG. 2 depicts an exemplary mapping process for a network port on the exemplary packet switch appliance depicted in FIG. 1;

FIG. 3 depicts another exemplary packet switch appliance; and

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
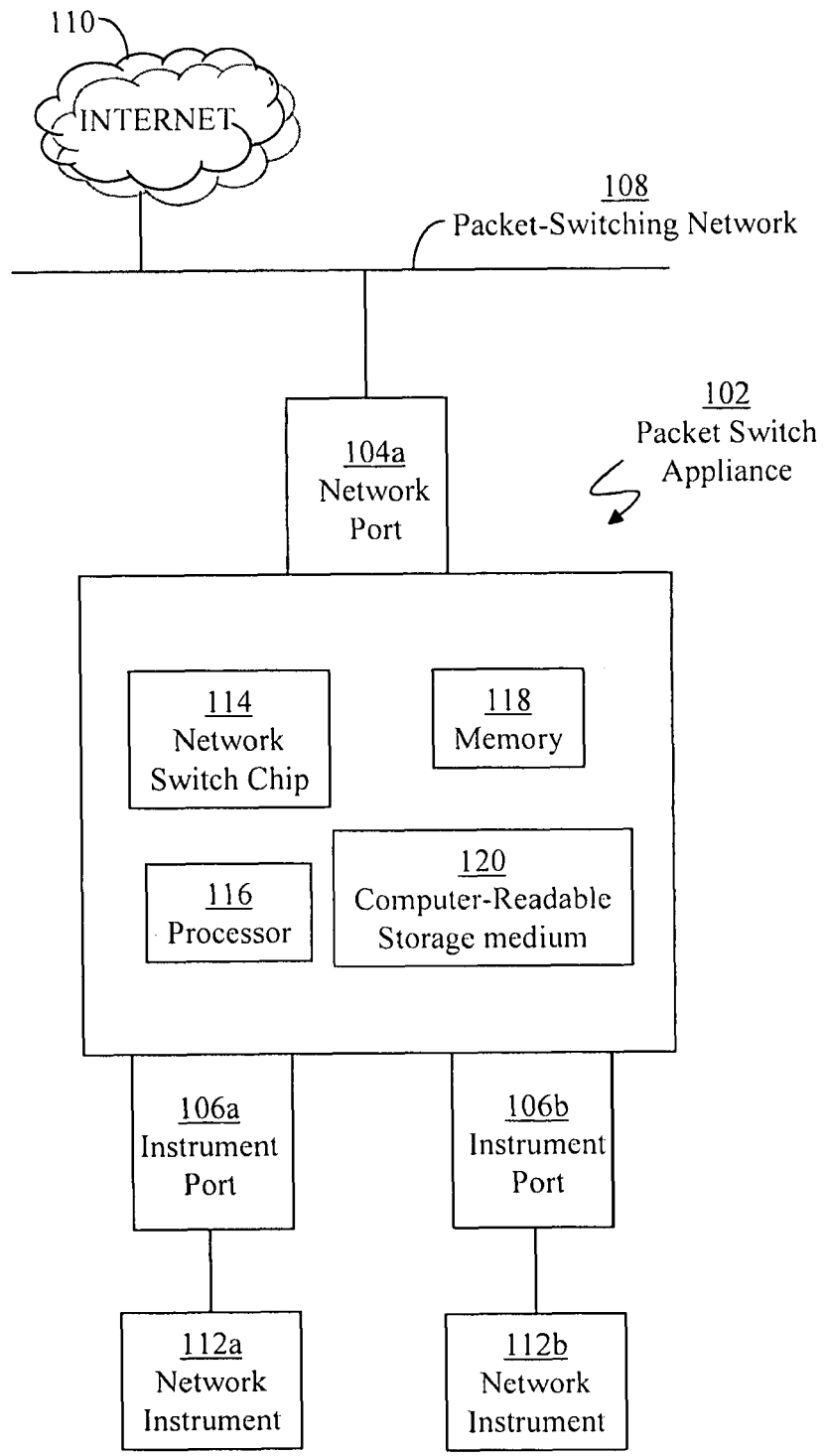
FIG. 1 depicts an exemplary packet switch appliance.

With reference to FIG. 1, an exemplary packet switch appliance 102 is depicted. Packet switch appliance 102 includes a plurality of ports. In FIG. 1, packet switch appliance 102 is depicted with one port configured as a network port 104*a*, which is connected to packet-switching network 108. Two additional ports on packet switch appliance 102 are depicted as being configured as instrument port 106*a*, which is connected to network instrument 112*a*, and instrument port 106*b*, which is connected to network instrument 112*b*. Packet switch appliance 102 receives traffic through network port 104*a* and distributes the traffic to instrument ports 106*a* and 106*b*. In distributing the traffic, packet switch appliance 102 can perform various functions, such as one-to-one, one-to-many, many-to-one, and many-to-many port distributing; ingress and egress filtering; flow-based streaming; and load balancing. For a more detailed description of these features, see U.S. patent application Ser. Nos. 11/123,273; 11/123,377; 11/123,465; and 11/123,729, which were filed on May 5, 2005, and which are incorporated herein by reference in their entireties.

In some embodiments, the packet switch appliance 102 may be configured to support the following functionalities concerning the movements of packets within a network visibility system:

a. One-to one: Ingress packets at one port are taken out of another port. In some embodiments, ingress packets at a network port are provided to an instrument port.

b. One-to-Many: Packets are provided from one network port and are multicasted to multiple instrument ports.

c. Many-to-One: Aggregate packets from multiple network ports are sent to one instrument port.

d. Many-to-Many: Packets are aggregated from multiple network ports and the aggregated traffic stream is multicasted to multiple instrument ports.

One-to-One Packet Movement

One-to-One: Ingress packets at one port are provided to another port. In some embodiments, this involves taking ingress packets at a network port and egress out of an instrument port. However, one-to-one can also be used for port-pairing, that is, traffic entering a network port is sent out of another network port, and vice versa, making these two network ports form a port-pair. There are three different methods to implement one-to-one packet movement.

The first method involves using a virtual local area network (VLAN) identifier to direct the packets. A VLAN is created with membership having only the two ports involved in this one-to-one connection. For example, suppose the VLAN number for this VLAN is X. The ingress port is set up such that the default VLAN ID is X. With this setting, all packets entering the ingress port will be tagged with a VLAN tag having VLAN number X. All such ingress packets will be flooded out of the second port, hence forming a one-to-one connection. Also, the egress port is configured such that the VLAN tag X is removed as the packets come of out the port.

One criterion for the VLAN method to work is to have the switch capable of doing double VLAN tagging on a per port basis. With double VLAN tagging on, all ingress packets will have a VLAN tag of VLAN number X, independent of whether such packets already have VLAN tags or not before they come into the network monitor port. The VLAN number assigned to any particular one-to-one connection is automatically assigned by the network visibility system software and the user does not need to know about this. All the user sees is that packets entering one port come out of another port. The VLAN method supports bi-directional flow of packets between the two any-to-any ports if both ports are set up with default VLAN IDs equal the VLAN number.

A second method involves using port mirroring. For a one-to-one connection involving ports A and B, one can set up a mirror port B for port A such that all packets entering port A will get sent out of port B. Mirroring can be done independent of whether the packets already come with VLAN tags or not before they enter network monitor. Also, mirroring allows ingress error packets to come out as-is at the egress port.

The third method involves using a packet switch port filtering feature to direct a packet that enters a given port to out of another port. The advantage of using a filter is that it can re-direct packets to any port without being restrained by their VLAN memberships One-to-Many Packet Movement One-to-Many: Packets from one network port are multicasted to multiple instrument ports. In some embodiments, one-to-many is used to multicast traffic entering a given network port to multiple instrument ports.

One-to-Many can be implemented using VLAN. A VLAN is created such that the ingress network port and the multiple instrument ports are the only members of this VLAN. For example, suppose a VLAN is created with VLAN number X containing members of the above mentioned ports. The ingress network port is set up such that the default VLAN ID is X. The instrument ports in this one-to-many configuration are set up such that the VLAN tag of each packet is removed when a packet exits out of each instrument port. The double VLAN tagging feature is needed for this configuration.

When a packet enters the network port, a VLAN tag of VLAN ID X is added to the packet inside the switches, independent of whether this packet already comes with VLAN tags or not. This packet will be flooded to all the instrument ports of this VLAN because they all belong to VLAN X. The VLAN tag with VLAN ID X is removed when the packet (or a copy of it) exits each instrument port.

Many-to-One Packet Movement

Many-to-One: Takes packets from multiple ports to one port. In some embodiments, Many-to-One is used to aggregate multiple packet streams from multiple network ports to one instrument port. For example, one may want to aggregate Voice over IP traffic from multiple network segments to one network analyzer.

Many-to-Many Packet Movement

Many-to-Many: Aggregate packets from multiple network ports and multicast the aggregated traffic stream to multiple instrument ports. In some embodiments, this may be a configuration resulting from a combination of any-to-any, one-to-many and many-to-one and can be configured using VLAN and filter redirection.

FIG. 1 depicts packet-switching network 108 being connected to the Internet 110. It should be recognized, however, that packet-switching network 108 can be a private network having various types of network devices. FIG. 1 also depicts two network instruments 112a and 112b connected to instrument ports 106a and 106b, respectively. It should be recognized that the two network instruments 112a and 112b can be the same type of device or different types of devices, such as sniffers, intrusion detection systems (IDS), intrusion prevention systems (IPS), forensic recorders, and the like.

In one exemplary embodiment, at least one network port 104a of packet switch appliance 102 is mapped. In particular, with reference to FIG. 2, an exemplary mapping process 200 is depicted. For the sake of clarity, the following description describes one network port being mapped using mapping process 200. It should be recognized, however, that any number of network ports can be mapped using mapping process 200.

In step 202, a port map is created. In the present exemplary embodiment, the port map includes a series of two or more map rules. Each map rule has a criterion and an action, which is performed when the criterion of the map rule is met. For example, an exemplary port map can include a first map rule and a second map rule. The first map rule can include a first criterion and a first action. The second map rule can include a second criterion and a second action.

In one exemplary implementation, a port map can be created by creating a port map object and creating the map rules for the port map object. For example, the port map object can be created using the command, "config map alias <string>". A map rule can be created using the command, "config maprule <map-alias/map-id> rule [criterion] tool [action]". It should be recognized, however, that various commands can be used to create the port map object and the map rules.

A criterion of a map rule can specify a value of any portion or portions of a packet. For example, a criterion of a map rule can specify a bit value or byte values at certain offsets from the beginning of a packet, a virtual local area network (VLAN) identification of the packet, source address, destination address, and the like. When a packet matches the criterion of a map rule, the action of the map rule can be to drop the matching packet. Alternatively, the action of the map rule can be to forward the matching packet to one or more specified instrument ports, including a list of instrument ports.

In the present exemplary embodiment, a port map can include a "garbage collection" rule, which includes a criterion and an action. The action of the "garbage collection" rule is performed when the criteria of all other map rules of the port map are not met. The action of the "garbage collection" rule can be to drop the packet. Alternatively, the action of the "garbage collection" rule can be to forward the packet to one or more specified instrument ports.

With reference again to FIG. 2, in step 204, the created port map can be assigned to a network port. With reference to FIG. 1, as described above, at least one of the ports of packet switch appliance 102 is configured as a network port 104a, which is connected to packet-switching network 108. The port map can be assigned to network port 104a. For example, a port map can be assigned using the command, "config mapping net <network port number or network port list> map <map-alias/map-id>". It should be recognized, however, that various commands can be used to assign the port map to a network port.

One port map can be assigned to any number of additional network ports. For example, if three ports of packet switch appliance 102 are configured as network ports, then one, two, or all three network ports can be assigned the same port map. Alternatively, each network port can be assigned different port maps.

In the present exemplary embodiment, a port map is only assigned to network ports and not to instrument ports. Thus, with reference to FIG. 1, the flow of packets in packet switch appliance 102 is from a network port 104a to one or more instrument ports 106a, 106b rather than from an instrument port 106a or 106b to a network port 104a.

With reference again to FIG. 2, in step 206, when an ingress packet is received from the packet-switching network through a network port that has been assigned a port map, the port map assigned to the network port is applied to the ingress packet. As described above, the criterion of a map rule can specify a value of any portion or portions of a packet, such as a bit value or byte values at certain offsets from the beginning of a packet, a virtual local area network (VLAN) identification of the packet, source address, destination address, and the like. Thus, when an ingress packet is received, the received ingress packet is examined. The criteria of the map rules are evaluated based on the examination of the ingress packet.

In one optional implementation, the map rules of the port map can be applied to the ingress packet in a predetermined order. For example, assume that a first map rule is ordered ahead of a second map rule. Thus, when an ingress packet is received, the first criterion of the first map rule is evaluated before the second criterion of the second map rule. If the first criterion is met, then the first action of the first map rule is performed. Also, if the first criterion is met, then the second criterion or any other criterion in the port map is not evaluated because the first map rule is ordered ahead of the second map rule and all other map rules in the port map. Hence none of the actions of the other map rules are performed because none of the other criteria of the other map rules in the port map are evaluated once the first criterion of the first map rule is met. If the first criterion is not met, then the second criterion is evaluated. If the second criterion is met, then the second action is performed. Assuming there are no other map rules in the port map, then the action of the "garbage collection" rule is performed.

Note, the "garbage collection" action is performed only if none of the criteria of the other map rules in the port map are met. In this example, assuming that the port map only has the first and second map rules, then the action of the "garbage collection" rule is performed if only both the first and second criteria are not met. In one example, the criterion of the "garbage collection" rule is a null, which means that the criterion of the "garbage collection" rule will always be met when it is evaluated. Thus, when the port map is applied, all the criteria of all map rules other than the "garbage collection" rule are evaluated before the null criterion of the "garbage collection" rule is evaluated to perform the action of the "garbage collection" rule.

In another optional implementation, all of the map rules of the port map can be applied to an ingress packet received through a network port. A rule resolution procedure can be applied if the criteria of multiple map rules of the port map are met. The rule resolution procedure can include, but not limited to, performing the action of the map rule with the criterion that was first met, performing the action of the map rule with the criterion that was last met, or performing the actions of all the map rules with criteria that were met. If none of the criteria of the map rules other than the "garbage collection" rule in the port map are met, then the action of the "garbage collection" rule can be performed.

As described above, when an ingress packet meets the criterion specified in a map rule, the action of a map rule can be to drop the ingress packet. Alternatively, the action can be to forward the ingress packet to one or more instrument ports. Thus, in this manner, ingress packets received through a network port can be distributed amongst any number of instrument ports based on the map rules of the port map assigned to the network port.

As a first example, with reference to FIG. 1, assume a port map has been assigned to network port 104a depicted in FIG. 1. Assume that the assigned port map includes a first map rule with a first criterion and a first action, which is to forward matching ingress packets to both instrument ports 106a and 106b depicted in FIG. 1. Thus, when an ingress packet is received through network port 104a that matches the first criterion, the matching ingress packet is forwarded to instrument ports 106a and 106b. In this manner, the matching ingress packet is forwarded to network instrument 112a, which is connected to instrument port 106a, and network instrument 112b, which is connected to instrument port 106b.

As a second example, assume now that the first action of the first map rule is to forward matching ingress packets only to instrument port 106a. Assume also that the second action of the second map rule is to forward matching ingress packets only to instrument port 106b. Thus, when an ingress packet is received, if the ingress packet matches the first criterion of the first map rule, then the matching ingress packet is forwarded to instrument port 106a. If the ingress packet matches the second criterion of the second map rule, then the matching ingress packet is forwarded to instrument port 106b. Thus, ingress packets received through network port 104a can be distributed between instrument ports 106a and 106b based on the map rules of the port map assigned to network port 104a.

As a third example, with reference to FIG. 3, now assume that another port on packet switch appliance 102 is configured as another instrument port 106c, which is connected to another network instrument 112c. Assume that the first action of the first map rule is to forward matching ingress packets to instrument ports 106a and 106b. Assume also that the second action of the second map rule is to forward matching ingress packets to instrument port 106c. Thus, when an ingress packet is received, if the ingress packet matches the first criterion of the first map rule, then the matching ingress packet is forwarded to instrument ports 106a and 106b. If the ingress packet matches the second criterion of the second map rule, then the matching ingress packet is forwarded to instrument port 106c.

As a fourth example, now assume that the first action of the first map rule is to forward matching ingress packets to instrument port 106a. Assume also that the second action of the second map rule is to forward matching ingress packets to instrument ports 106b and 106c. Thus, when an ingress packet is received, if the ingress packet matches the first criterion of the first map rule, then the matching ingress packet is forwarded to instrument port 106a. If the ingress packet matches the second criterion of the second map rule, then the matching ingress packet is forwarded to instrument ports 106b and 106c.

Figure 4:
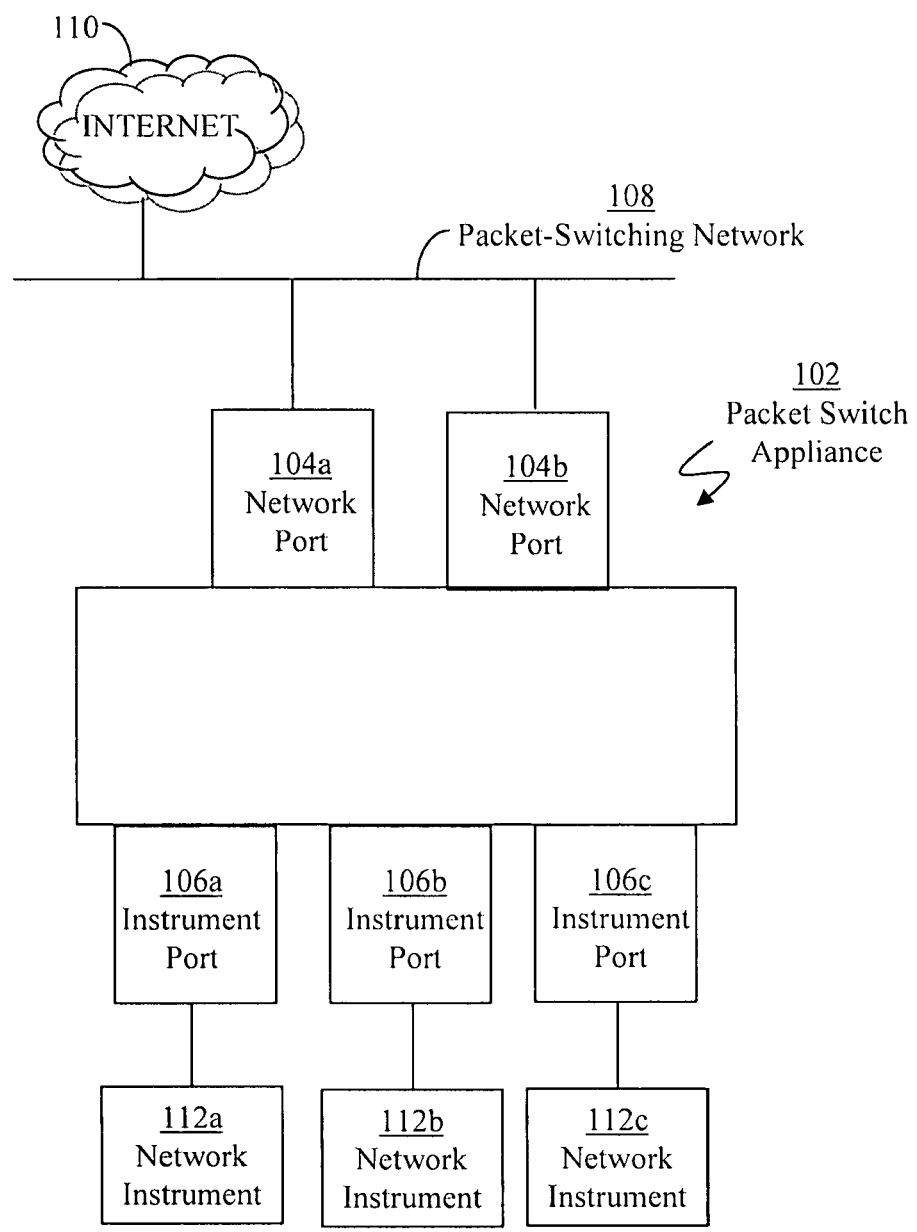
FIGS. 4-6 depict additional exemplary embodiments of a packet switch appliance.

As a fifth example, with reference to FIG. 4, now assume that another port on packet switch appliance 102 is configured as another network port 104b connected to packet-switching network 108. The same port map can be assigned to network port 104a and network port 104b. Thus, when an ingress packet is received through network port 104b, the same port map is applied as if the ingress packet was received through network port 104a. Alternatively, different port maps can be assigned to network port 104a and network port 104b. For example, a first port map can be assigned to network port 104a, and a second port map can be assigned to network port 104b. The first port map can include a first map rule, which has a first criterion and a first action, and a second map rule, which has a second criterion and a second action. The second port map can include a third map rule, which has a third criterion and a third action, and a fourth map rule, which has a fourth criterion and a fourth action. Thus, when an ingress packet is received through network port 104*a*, the first port map is applied to the ingress packet. When an ingress packet is received through network port 104*b*, the second port map is applied to the ingress packet.

As described above, dropping a packet is one action that can be performed when a criterion of a map rule is met. In one exemplary implementation, the action to drop a packet is implemented in a manner similar to the action to forward a packet to an instrument port. For example, a packet is forwarded to an instrument by the following map rule: "config map-rule <map-alias/map-id> rule [criterion] tool [instrument port]". A packet is dropped by the following map rule: "config map-rule <map-alias/map-id> rule [criterion] tool [drop]". Thus, dropping a packet can be viewed as forwarding the packet to a virtual drop port, which is not a physical port.

In one exemplary implementation, each map rule of a port map can be implemented using a filter. For example, with reference to FIG. 3, assume a first map rule of a port map assigned to network port 104*a* has a first criterion and a first action, which specifies that a packet matching the first criterion is forwarded to instrument port 106*a*. Assume a second map rule of the port map assigned to network port 104*a* has a second criterion and a second action, which specifies that a packet matching the second criterion is forwarded to instrument port 106*b*.

In the present exemplary implementation, a first filter is assigned to network port 104*a* with a criterion, which matches the first criterion of the first map rule, and an action, which matches the first action of the first map rule (i.e., to forward a matching packet to instrument port 106*a*). Thus, when a packet is received that matches the criterion of the first filter, the packet is forwarded to instrument port 106*a*. A second filter is assigned to network port 104*a* with a criterion, which matches the second criterion of the second map rule, and an action, which matches the second action of the second map rule (i.e., to forward a matching packet to instrument port 106*b*). Thus, when a packet is received that matches the criterion of the second filter, the packet is forwarded to instrument port 106*b*.

As described above, the action of one map rule can be to forward a packet to multiple instrument ports. A typical filter, however, can only forward a packet to a single port. Thus, in the present exemplary embodiment, a loop-back port is used in conjunction with a VLAN domain to implement a map rule that forwards a packet to multiple instrument ports.

Figure 5:
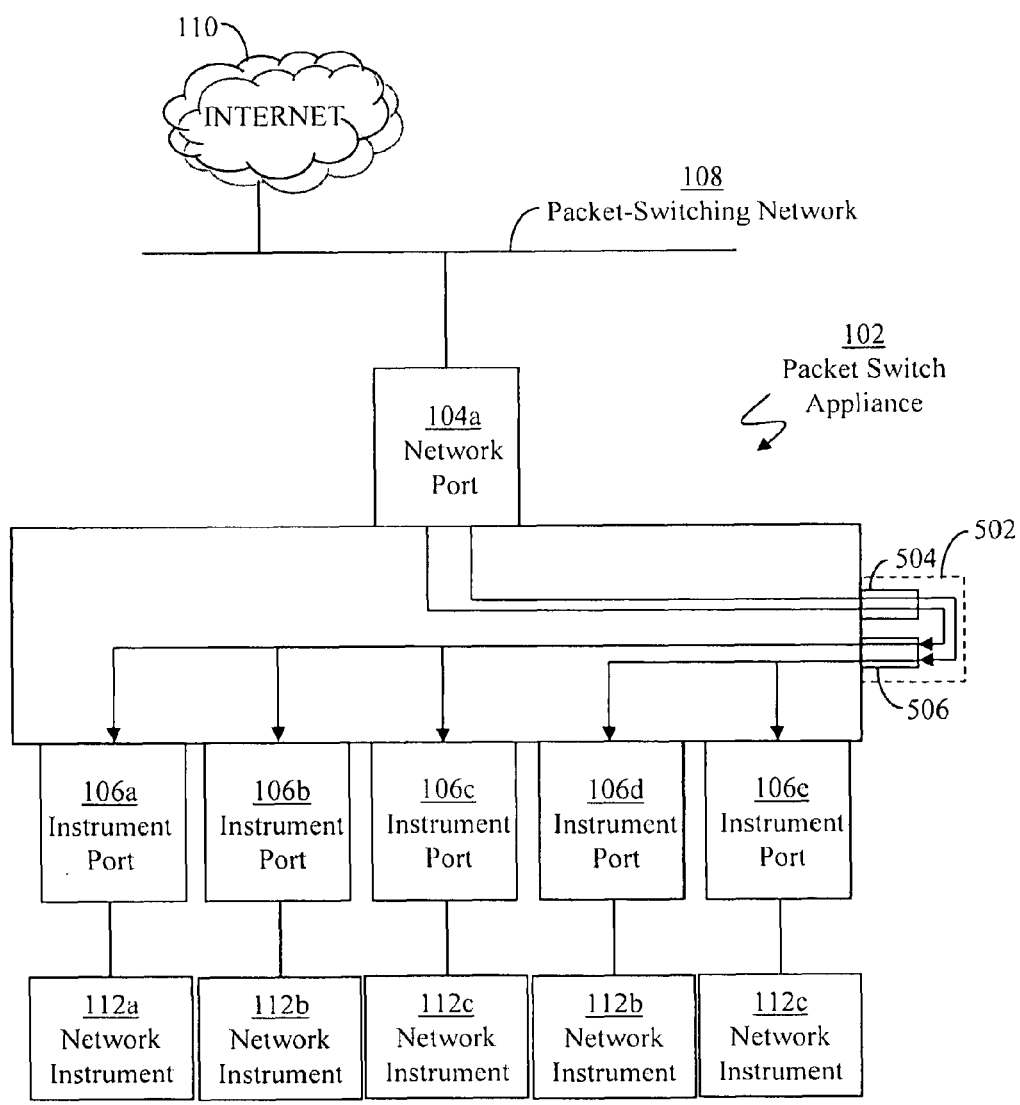

In particular, with reference to FIG. 5, packet switch appliance 102 is depicted with a loop-back port 502. As depicted in FIG. 5, loop-back port 502 includes an egress portion 504 and an ingress portion 506. Thus, when a packet is sent to loop-back port 502, the packet is sent out via egress portion 504 and looped back via ingress portion 506. In the present exemplary implementation, egress portion 504 is configured not to remove VLAN tags from packets, and ingress portion 506 is configured not to add VLAN tags to packets.

Loop-back port 502 can be implemented using a single port. For example, egress portion 504 and ingress portion 506 can be separate paths in a single full-duplex port. Alternatively, loop-back port 502 can be implemented using a pair of ports connected together. For example, egress portion 504 can correspond to a first port, and ingress portion 506 can correspond to a second port, which is separate from the first port but connected to the first port.

Assume a first map rule of a port map assigned to network port 104*a* has a first criterion and a second action, which specifies that a packet matching the first criterion is forwarded to instrument ports 106*a*, 106*b*, and 106*c*. Assume a second map rule of the port map assigned to network port 104*a* has a second criterion and a second action, which specifies that a packet matching the second criterion is forwarded to instrument ports 106*d* and 106*e*.

In the present exemplary implementation, a first VLAN is created having a membership that includes loop-back port 502 and instrument ports 106*a*, 106*b*, and 106*c*. A first filter is assigned to network port 104*a* with a criterion, which matches the first criterion of the first map rule, and an action, which specifies that the VLAN tag of a packet matching the criterion of the first filter be replaced with a first VLAN tag that corresponds to the first VLAN. The action of the first filter also specifies that the packet matching the criterion of the first filter be forwarded to loop-back port 502. The matching packet is sent out via port 504 without removing the first VLAN tag and looped-back via port 506 without adding any more VLAN tags. As depicted in FIG. 5, because instrument ports 106*a*, 106*b*, and 106*c* are members of the first VLAN, the matching packet is forwarded to instruments port 106*a*, 106*b*, and 106*c* when it is looped back via port 506 with the first VLAN tag.

A second VLAN is created having a membership that includes loop-back port 502 and instrument ports 106*d* and 106*e*. A second filter is assigned to network port 104*a* with a criterion, which matches the second criterion of the second map rule, and an action, which specifies that the VLAN tag of a packet matching the criterion of the second filter be replaced with a second VLAN tag that corresponds to the second VLAN. The action of the second filter also specifies that the packet matching the criterion of the second filter be forwarded to loop-back port 502. The matching packet is sent out via port 504 without removing the second VLAN tag and looped back via port 506 without adding any more VLAN tags. As depicted in FIG. 5, because instrument ports 106*d* and 106*e* are members of the second VLAN, the matching packet is forwarded to instruments port 106*d* and 106*e* when it is looped back via port 506 with the second VLAN tag.

Figure 6:
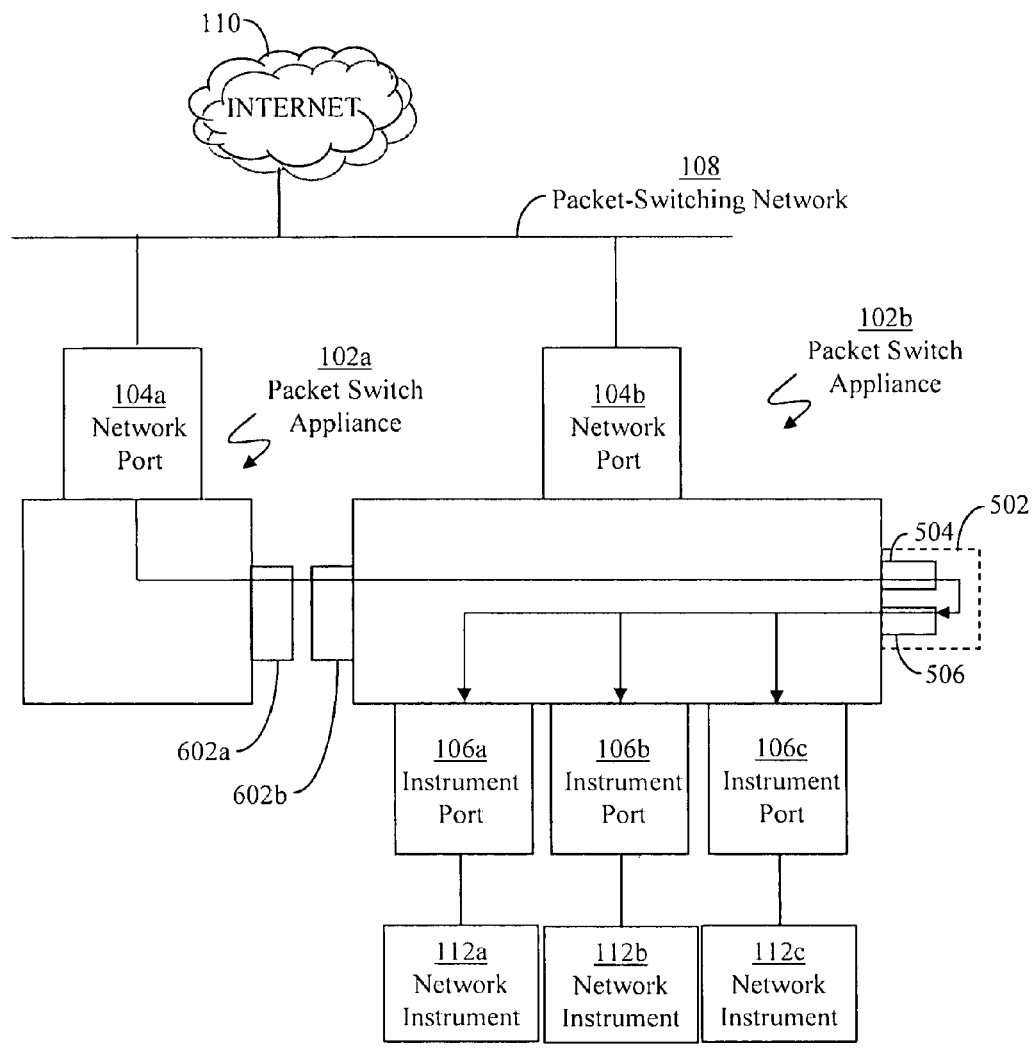

With reference to FIG. 6, multiple packet switch appliances can be stacked together using ports on the packet switch appliances configured to be transport ports. For example, packet switch appliances 102*a* and 102*b* can be stacked together using port 602*a* and 602*b*, which are configured as transport ports. For a more detailed description of stacking packet switches together, see U.S. patent application Ser. Nos. 11/123,273; 11/123,377; 11/123,465; and 11/123,729, which were filed on May 5, 2005, and which are incorporated herein by reference in their entireties.

As depicted in FIG. 6, in one exemplary implementation, the action of a map rule in a port map assigned to a network port on one packet switch appliance can include forwarding a packet to one or more instrument ports on another packet switch appliance. In the example depicted in FIG. 6, assume the action of a map rule assigned to network port 104*a* on packet switch appliance 102*a* is to forward a packet to instrument ports 106*a*, 106*b*, and 106*c* on packet switch appliance 102*b*. Thus, in this example, a logical connection is established between network port 104*a* on packet switch appliance 102*a* and loop-back port 502 on packet switch appliance 102*b*. A VLAN is created having a membership that includes loop-back port 502 and instrument ports 106*a*, 106*b*, and 106*c*. A filter is assigned to network port 104*a* with a criterion, which matches the criterion of the map rule, and an action, which specifies that the VLAN tag of a packet patching the criterion of the filter be replaced with a VLAN tag that corresponds to the VLAN with loop-back port 502 and instrument ports 106a, 106b, and 106c as members. The action of the filter also specifies that the packet matching the criterion of the filter be forwarded to loop-back port 502 via transport ports 602a and 602b. Thus, when a packet is received through network port 104a on packet switch appliance 102a that matches the criterion of the filter, the packet is forwarded to loop-back port 502 on packet switch appliance 102b through transport ports 602a and 602b. The packet is then forwarded to instrument ports 106a, 106b, and 106c on packet switch appliance 102b.

In one exemplary implementation, in creating a port map for a network port, a user is prompted to specify whether an action of a map rule in the port map will forward a packet to a single port or multiple instrument ports. If the user specifies that the action will forward a packet to a single instrument port, then the action of the filter used to implement the map rule will be to forward the packet to the single instrument port as described above. If the user species that the action will forward a packet to multiple instrument ports, then the action of the filter used to implement the map rule will be to replace the VLAN tag of the packet with the VLAN tag of the VLAN having the multiple instrument ports as members and to forward the packet to a loop-back port as described above.

With reference again to FIG. 1, packet switch appliance 102 includes a network switch chip 114, a processor 116, memory 118, and a computer-readable storage medium 120. In the present exemplary embodiment, the various switching functions described above can be performed used network switch chip 114, processor 116, and memory 118. Any software, including the operating system, needed to operate packet switch appliance 102 can be stored as computer-executable instructions stored on computer-readable storage medium 120. For example, the computer-executable instructions to perform mapping process 200 (FIG. 2) can be stored on computer-readable storage medium 120. It should be recognized, however, that any one or more of these components can be omitted or any number of additional components can be added to packet switch appliance 102.

As shown in FIGS. 1, 4, 5, and 6, the packet switch appliance 102 is configured to pass packets from a network to one or more network instrument(s) through instrument port(s). Thus, the packet switch appliance 102 is configured to process network traffic from the network in an out-of-band configuration. In such cases, the packet received at the packet switch appliance 102 may have a first destination address associated with a first location, and the packet switch appliance 102 (e.g., the processing unit 114 and/or 116 therein) may be configured to pass the packet to at least one of the instrument ports for transmission to the respective network monitoring instrument at a second location that is different from the first location.

Although exemplary embodiments have been described, various modifications can be made without departing from the spirit and/or scope of the present invention. Therefore, the present invention should not be construed as being limited to the specific forms shown in the drawings and described above.

We claim:

1. A packet switch device for providing visibility of traffic in a network, comprising:
a processing unit;
a first network port communicatively coupled to the processing unit, wherein the first network port is configured to communicate with the network;
a plurality of instrument ports communicatively coupled to the processing unit, each of the instrument ports configured to communicate with a respective network monitoring instrument;
wherein the processing unit is configured to:
process a packet received at the first network port using a first rule with a first criterion, and
process the packet received at the first network port using a second rule with a second criterion;
wherein each of the first criterion and the second criterion specifies a packet value, wherein the packet value specified by the first criterion is for comparison with a value of a portion of the packet, and wherein the processing unit is configured to drop or forward the packet based at least in part on a result from the comparison.

2. The packet switch device of claim 1, wherein:
the first rule is for performing packet forwarding to a first instrument port of the plurality of instrument ports; and
the second rule is for performing packet forwarding to a second instrument port of the plurality of instrument ports.

3. The packet switch device of claim 1, wherein the first rule is for performing packet dropping, not packet forwarding.

4. The packet switch device of claim 1, wherein the first rule is for performing packet forwarding, not packet dropping.

5. The packet switch device of claim 4, wherein the first rule is for performing packet forwarding to only one of the plurality of instrument ports.

6. The packet switch device of claim 4, wherein the first rule is for performing packet forwarding to multiple ones of the plurality of instrument ports.

7. The packet switch device of claim 1, wherein the processing unit is configured to receive an input from a user for specifying whether the first rule is for performing packet forwarding to one of the instrument ports, or a plurality ones of the instrument ports.

8. The packet switch device of claim 1, wherein the packet switch device is configured to process network traffic from the network in an out-of-band configuration.

9. The packet switch device of claim 1, wherein the packet has a first destination address associated with a first location, and the processing unit is configured to pass the packet to at least one of the instrument ports for transmission to the respective network monitoring instrument at a second location that is different from the first location.

10. The packet switch device of claim 1, wherein the processing unit is configured to forward the packet received at the first network port to only one of the plurality of instrument ports.

11. The packet switch device of claim 1, wherein the processing unit is configured to multicast the packet received at the first network port to multiple ones of the plurality of instrument ports.

12. The packet switch device of claim 1, further comprising a second network port configured to communicate with the network.

13. The packet switch device of claim 12, wherein the processing unit is configured to aggregate the packet received at the first network port and another packet received at the second network port to one of the plurality of instrument ports.

14. The packet switch device of claim 12, wherein the processing unit is configured to aggregate the packet received at the first network port and another packet received at the second network port, and multicast the aggregated packets to multiple ones of the instrument ports.

15. The packet switch device of claim 1, wherein one of the respective network monitoring instruments comprises a sniffer, an intrusion detection system, an intrusion prevention system, or a forensic recorder.

16. The packet switch device of claim 1, further comprising a second network port, wherein the processing unit is configured for:
   moving the packet received at the first network port to one of the plurality of instrument ports (one-to-one function),
   multicasting the packet received at the first network port to multiple ones of the plurality of instrument ports (one-to-many function),
   aggregating the packet from the first network port and another packet received at the second network port to one of the plurality of instrument ports (many-to-one function),
   multicasting packets aggregated from the first network port and the second network port to multiple ones of the plurality of instrument ports (many-to-many function), wherein the packets include the packet received from the first network port, or
   any combination thereof.

17. The packet switch device of claim 1, wherein the processing unit is configured to apply the first rule and the second rule in a pre-determined order.

18. A method performed by a packet switch device for providing visibility of traffic in a network, comprising:
   receiving a packet at a first network port that is communicatively coupled to a processing unit, wherein the first network port is configured to communicate with the network, and wherein the processing unit is communicatively coupled to a plurality of instrument ports that are configured to communicate with respective network monitoring instruments;
   processing the packet received at the first network port using a first rule with a first criterion, and
   processing the packet received at the first network port using a second rule with a second criterion;
   wherein each of the first criterion and the second criterion specifies a packet value, wherein the packet value specified by the first criterion is for comparison with a value of a portion of the packet, and wherein the packet is dropped or forwarded to one or more of the instrument ports based at least in part on a result of the comparison.

19. The method of claim 18, wherein:
   the first rule is for performing packet forwarding to a first instrument port of the plurality of instrument ports; and
   the second rule is for performing packet forwarding to a second instrument port of the plurality of instrument ports.

20. The method of claim 18, wherein the first rule is for performing packet dropping, not packet forwarding.

21. The method of claim 18, wherein the first rule is for performing packet forwarding, not packet dropping.

22. The method of claim 21, wherein the first rule is for performing packet forwarding to only one of the plurality of instrument ports.

23. The method of claim 21, wherein the first rule is for performing packet forwarding to multiple ones of the plurality of instrument ports.

24. The method of claim 18, further comprising receiving an input from a user for specifying whether the first rule is for performing packet forwarding to one of the instrument ports, or a plurality ones of the instrument ports.

25. The method of claim 18, wherein the packet switch device is configured to process network traffic from the network in an out-of-band configuration.

26. The method of claim 18, wherein the packet has a first destination address associated with a first location, and the method further comprises passing the packet to at least one of the instrument ports for transmission to the respective network monitoring instrument at a second location that is different from the first location.

27. The method of claim 18, further comprising forwarding the packet received at the first network port to only one of the plurality of instrument ports.

28. The method of claim 18, further comprising multicasting the packet received at the first network port to multiple ones of the plurality of instrument ports.

29. The method of claim 18, further comprising receiving another packet at a second network port that communicates with the network.

30. The method of claim 29, further comprising aggregating the packet received at the first network port and other packet received at the second network port to one of the plurality of instrument ports.

31. The method of claim 29, further comprising:
   aggregating the packet received at the first network port and the other packet received at the second network port; and
   multicasting the aggregated packets to multiple ones of the instrument ports.

32. The method of claim 18, wherein one of the respective network monitoring instruments comprises a sniffer, an intrusion detection system, an intrusion prevention system, or a forensic recorder.

33. The method of claim 18, wherein the first rule and the second rule are used in a pre-determined order.

34. The packet switch device of claim 1, wherein the packet value specified by the first criterion comprises a first bit value.

35. The packet switch device of claim 34, wherein the packet value specified by the second criterion comprises a second bit value.

36. The packet switch device of claim 1, wherein the packet value specified by the first criterion comprises a source address, a destination address, or a tag value.

37. The packet switch device of claim 1, wherein the first rule comprises a first packet movement rule.

38. The packet switch device of claim 37, wherein the second rule comprises a second packet movement rule.

39. The method of claim 18, wherein the packet value specified by the first criterion comprises a first bit value.

40. The method of claim 39, wherein the packet value specified by the second criterion comprises a second bit value.

41. The method of claim 18, wherein the packet value specified by the first criterion comprises a source address, a destination address, or a tag value.

42. The method of claim 18, wherein the first rule comprises a first packet movement rule.

43. The method of claim 42, wherein the second rule comprises a second packet movement rule.

44. The packet switch device of claim 1, wherein the first rule and the second rule are pre-determined before the packet is received.

45. The method of claim 18, wherein the first rule and the second rule are pre-determined before the packet is received.

* * * * *